United States Patent Office 3,120,524
Patented Feb. 4, 1964

3,120,524
METHOD FOR PREPARING N-ALKYL SUBSTITUTED PIPERAZINES
Norman B. Godfrey, Austin, Tex., assignor to Jefferson Chemical Company, Inc., Houston, Tex., a corporation of Delaware
No Drawing. Filed Dec. 15, 1958, Ser. No. 780,269
4 Claims. (Cl. 260—268)

This invention relates to an improved method for preparing substituted piperazines, particularly, a method for preparing N-monoalkyl piperazines.

Recently there has been considerable commercial interest taken in the piperazine compounds including the N-monoalkyl-substituted piperazines. This has been brought about by the widening use of these compounds as pharmaceuticals and as chemical intermediates in the production of various end products. Known processes for producing N-substituted piperazines, such as Bain and Pollard, Journal of American Chemical Society 61, 2704 (1939), yield substantial amounts of the dialkyl-substituted piperazines but have the disadvantage that little or no economically recoverable amounts of the N-monoalkyl-substituted piperazines are produced.

An effective method has now been discovered for preparing N-monoalkyl-substituted piperazines. This method has the advantage that it permits a one-step synthesis from readily available materials. Further advantages of the process are that the reaction is more specific and economical and may be conducted in short reaction times and/or at a lower operating temperature through the use of highly active catalysts under efficient reaction conditions.

In accordance with this invention, N-monoalkyl piperazine may be prepared by contacting an amine, defined hereinbelow, with a hydrogenation catalyst in the presence of hydrogen at an elevated temperature and pressure, said amine being represented by a formula selected from the group consisting of:

(1) 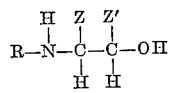

(2) 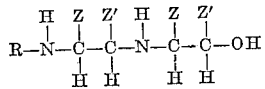

and (3) 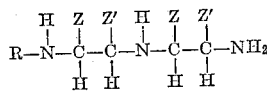

in which R represents an alkyl radical and Z and Z' represent hydrogen and an alkyl radical.

The compounds which may be employed for this reaction as defined in the formulas above include the N-alkyl substituted monoethanolamines, such as N-methyl-, N-ethyl-, N-propyl-, and N-octyl- monoethanolamines and their C-alkyl derivatives. Other suitable compounds for this reaction include N-methyldiethylene-triamine, N-ethyldiethylenetriamine, N - methyl-N'-aminoethylethanolamine, and N-propyl-N'-aminoethylaminoethanol. In general, the N-alkyl and C-alkyl radicals on these materials will be lower alkyl radicals having from 1 to about 8 carbon atoms.

The reaction of the amine compounds is normally conducted at an elevated temperature and at a superatmospheric pressure. Suitable temperatures may range from 150° C. to about 400° C. It has been found preferable, however, to conduct the reaction at a temperature from about 200° C. to about 300° C.

Above atmospheric pressures are generally employed so that the reaction is effected substantially in the liquid phase. Suitable superatmospheric pressures may range from about 30 to about 400 atmospheres, the range from about 65 to about 225 atmospheres being preferred.

The use of hydrogen and a hydrogenation catalyst is critical for the effective formation of the N-monoalkyl-substituted piperazines according to this process. Accordingly, the partial pressure of the hydrogen present must amount to or constitute a substantial part of the total pressure in the reaction system. Specifically, the hydrogen should constitute at least 10 and preferably 20 to 200 atmospheres of the total pressure in the system at reaction temperatures.

A wide range of hydrogenation catalysts may be employed in this process. Particularly suitable catalysts are selected from the group consisting of the metals and oxides of copper, nickel and cobalt including mixtures thereof. Any of the foregoing catalyst compositions may be promoted with a normally non-reducible metal oxide from the group consisting of oxides of chromium, aluminum, iron, calcium, magnesium, manganese and the rare earths to improve the activity of the principal catalyst. Mixed catalysts may conveniently be prepared by igniting and oxidizing mixtures of the corresponding metal nitrate or carbonate salts.

A preferred group of catalysts for this reaction are the mixed nickel, copper and chromium oxide catalysts. Catalysts of this type will consist of 44 to 94 atom percent nickel, 5 to 55 atom percent copper and 1 to 6 atom percent chromium. A specific preferred catalyst composition within these ranges consists of 75% NiO, 22% CuO and 3% $Cr_2O_3$.

When oxides of copper, nickel, and cobalt are employed as the catalysts, these oxides will generally be reduced to metal or to lower oxides by the hydrogen present during the reaction. Alternatively, however, such oxides may be prereduced by passing a stream of hydrogen over the oxide composition while heating it to a temperature of 200–400° C. Under such circumstances, care should be exercised to maintain the treated catalyst in a non-oxidizing environment until the reaction is started up.

The various catalyst compositions may be carried on an inert support such as silica, Filtros and alumina. Such catalysts, however, may be employed either with or without a support for use in a batch process or on a fixed bed continuous flow system. In conducting the reaction in a batch or non-continuous method, the amount of catalyst employed will conveniently be between about 5% to about 20% by weight based on the weight of the feed composition.

In conducting the present reaction, the non-gaseous feed materials are introduced into a suitable reaction vessel, such as an autoclave. The catalyst is then added in either an oxidized or reduced state. If in the latter condition, a non-oxidizing environment is preferably maintained, such as with hydrogen, nitrogen, etc., to prevent oxidation of the catalyst. Hydrogen is then generally used to sweep out the reaction zone and thereafter is charged into the vessel to provide the desired starting reaction conditions. Ammonia may also be employed to advantage in this reaction. Thus, substantially improved yields of the N-monoalkyl-substituted piperazines have been obtained when 1 to 3 mols of ammonia in proportion to the mols of feed compound have been employed. If desired, water may also be added to the reactants to promote the reaction. Thereafter, the sealed reaction vessel is heated to about 240°–250° C. generally producing a pressure of about 100 to 200 atmospheres and these conditions are maintained until the reaction is completed.

The following examples illustrate the practice of this invention:

Example I 150 g. of N-methyl monoethanolamine, 100 g. water and a catalyst prepared by reducing in a stream of hydrogen at 240° C. 20 g. mixed nickel, copper and chromium oxide containing 60.7% nickel, 12.2% copper and 1.37% chromium, made from the calcined, co-precipitated carbonates of the metals, were placed in a 1400 mm. stainless steel autoclave bomb which was closed and purged with hydrogen. 68 g. of anhydrous ammonia were introduced under pressure followed by hydrogen to a total pressure of 500 p.s.i.g. The bomb was heated and agitated for 38 minutes at 240° C., then cooled and opened. Fractional distillation of the products gave 36.7% of the theoretical yield of N-methylpiperazine, 9.2% of N,N'-dimethylpiperazine, 4.5% of N-methylethylenediamine and 3.1% of N,N'-dimethylethylenediamine at 98.3% conversion of the N-methyl monoethanolamine feed.

Example II 128 g. of N-ethyl-ethanolamine, 100 g. of water, and 49 g. of ammonia were subjected to a reaction as described in Example I above. The products included substantial yields of N-ethylpiperazine, N,N'-diethylpiperazine, N-ethylethylenediamine and N,N'-diethylethylenediamine.

Example III 130 g. of a $C_{12}$-alkyl-substituted diethylenetriamine was subjected to a reaction as described above for two hours at 240° C. in the presence of 34 g. of ammonia and 100 g. of water. The crude product was filtered and the lower layer which separated was extracted with benzene. The upper layer and the benzene extract were combined and distilled. The fraction boiling point 138–153° C. at 55 mm. of mercury pressure absolute was an amber colored liquid titrating 95% pure as $C_{12}$-alkylpiperazine. It was insoluble in water but its hydrochloride showed surface-active and germicidal properties.

Obviously, many modifications and variations of the invention as hereinbefore set forth may be made without departing from the spirit and scope thereof and therefore only such limitations should be imposed as are indicated in the appended claims.

I claim:

1. A method for preparing an N-monoalkyl-substituted piperazine which comprises bringing a feed stock selected from a group consisting of an amine and a mixture of said amine with water into contact with a solid hydrogenation catalyst in the additional presence of hydrogen and ammonia only at a temperature within the range of about 150° to about 400° C., and a pressure from about 30 to 400 atmospheres, including a hydrogen partial pressure within the range of about 20 to 200 atmospheres, to form a reaction mixture containing an enhanced amount of said N-monoalkyl-substituted piperazine and recovering said N-monoalkyl-substituted piperazine from said reaction mixture, said amine being represented by the formula:

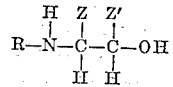

wherein R represents a lower alkyl radical, and Z and Z' are selected from the group consisting of hydrogen and lower alkyl, said catalyst comprising, as the catalytically active material, a major amount of a first component selected from the group consisting of metals and oxides of copper, nickel, cobalt and mixtures thereof, and a minor amount of a second promoter component selected from the group consisting of oxides of chromium, aluminum, iron, calcium, magnesium, manganese and the rare earth metal oxides, said ammonia being employed in the ratio of about 1 to 3 mols per mol of said amine.

2. A method for preparing an N-monoalkylpiperazine which comprises bringing a feed stock selected from a group consisting of an amine and a mixture of said amine with water into contact with a solid hydrogenation catalyst in the additional presence of hydrogen and ammonia only at a temperature within the range of about 200° to about 300° C., and a pressure from about 65 to 225 atmospheres, including a hydrogen partial pressure within the range of about 20 to 200 atmospheres, to form a reaction mixture containing an enhanced amount of said N-monoalkyl-substituted piperazine and a lesser amount of dialkyl-substituted piperazine and recovering said N-monoalkyl-substituted piperazine from said reaction mixture, said amine being represented by the formula:

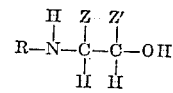

wherein R represents a lower alkyl radical, and Z and Z' are selected from the group consisting of hydrogen and lower alkyl, the catalyst consisting of nickel, copper, chromium oxide containing from about 44 to 94 atom percent nickel, 5 to 55 atom percent copper and 1 to 6 atom percent chromium, said ammonia being employed in the ratio of about 1 to 3 mols per mol of said amine.

3. A method as in claim 2 wherein the amine is N-methyl monoethanolamine and wherein the N-alkylpiperazine is N-methylpiperazine.

4. A method as in claim 2 wherein the amine is N-ethyl monoethanolamine and wherein the N-alkylpiperazine is N-ethylpiperazine.

References Cited in the file of this patent

UNITED STATES PATENTS

| | | |
|---|---|---|
| 2,427,473 | Pfann | Sept. 16, 1947 |
| 2,479,657 | Wilkes | Aug. 23, 1949 |
| 2,519,560 | Fowler | Aug. 22, 1950 |
| 2,809,195 | Miller | Oct. 8, 1957 |
| 2,813,869 | Langdon | Nov. 19, 1957 |
| 2,835,673 | Langdon | May 20, 1958 |
| 2,861,995 | MacKenzie | Nov. 25, 1958 |

FOREIGN PATENTS

| | | |
|---|---|---|
| 777,503 | Great Britain | June 26, 1957 |
| 791,050 | Great Britain | Feb. 19, 1958 |

OTHER REFERENCES

Jour. Pharm. Soc. (Japan), pp. 1051–1054 (1957).